United States Patent
Bhargava et al.

(10) Patent No.: US 7,591,013 B2
(45) Date of Patent: Sep. 15, 2009

(54) SYSTEM AND METHOD FOR CLIENT INITIATED AUTHENTICATION IN A SESSION INITIATION PROTOCOL ENVIRONMENT

(75) Inventors: Vivek Bhargava, Chapel Hill, NC (US); Ganesh Jayadevan, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 54 days.

(21) Appl. No.: 11/831,562

(22) Filed: Jul. 31, 2007

(65) Prior Publication Data
US 2008/0120715 A1    May 22, 2008

(51) Int. Cl.
G06F 9/00    (2006.01)
H04L 9/32    (2006.01)
H04L 9/00    (2006.01)

(52) U.S. Cl. ............ 726/14; 726/3; 726/4; 726/5; 726/6; 726/7; 713/151; 713/152; 713/153; 709/223; 709/224; 709/225; 709/226; 709/227

(58) Field of Classification Search ............ 726/14
See application file for complete search history.

(56) References Cited

U.S. PATENT DOCUMENTS

| | | | |
|---|---|---|---|
| 7,024,688 B1* | 4/2006 | Faccin et al. | 726/4 |
| 7,092,385 B2 | 8/2006 | Gallant et al. | 370/352 |
| 7,096,352 B2* | 8/2006 | Kang et al. | 713/152 |
| 7,110,393 B1 | 9/2006 | Tripathi et al. | 370/352 |
| 7,243,370 B2* | 7/2007 | Bobde et al. | 726/10 |
| 2002/0103850 A1 | 8/2002 | Moyer et al. | 709/202 |
| 2002/0103898 A1 | 8/2002 | Moyer et al. | 709/224 |
| 2003/0014668 A1* | 1/2003 | Faccin et al. | 713/201 |
| 2003/0177099 A1 | 9/2003 | Gallant et al. | 705/52 |
| 2003/0217165 A1 | 11/2003 | Buch et al. | 709/229 |
| 2004/0105433 A1 | 6/2004 | Seo | 370/352 |
| 2004/0139198 A1 | 7/2004 | Costa-Requena et al. | 709/227 |
| 2005/0220095 A1 | 10/2005 | Narayanan et al. | 370/389 |
| 2006/0056392 A1 | 3/2006 | Wang | 370/352 |
| 2006/0239253 A1 | 10/2006 | Gallant et al. | 370/352 |
| 2006/0265587 A1 | 11/2006 | Son et al. | 713/162 |
| 2007/0047571 A1 | 3/2007 | Kandikonda et al. | 370/449 |
| 2007/0121596 A1* | 5/2007 | Kurapati et al. | 370/356 |

OTHER PUBLICATIONS

Network Working Group "RFC 2617—HTTP AUthentication" The Internet Society 1999.*

* cited by examiner

*Primary Examiner*—Longbit Chai
(74) *Attorney, Agent, or Firm*—Baker Botts L.L.P.

(57) ABSTRACT

A system for client initiated authentication comprises a user agent client and a user agent server. The user agent client is operable to communicate a session initiation protocol request. The session initiation protocol request comprises an authenticate header and a require header that comprises a server authentication tag. The user agent server is operable to receive the session initiation protocol request. The user agent server is further operable to communicate a session initiation protocol response in response to the session initiation protocol request. The session initiation protocol response comprises an authorization header having a credential of the user agent server.

23 Claims, 2 Drawing Sheets

SYSTEM AND METHOD FOR CLIENT INITIATED AUTHENTICATION IN A SESSION INITIATION PROTOCOL ENVIRONMENT

TECHNICAL FIELD OF THE INVENTION

This invention relates in general to the field of network communications and more particularly to a system and method for client initiated authentication in a session initiation protocol environment.

BACKGROUND OF THE INVENTION

The session initiation protocol (SIP) is rapidly becoming the signaling protocol of choice in both enterprise and service provider environments. Service providers will soon begin peering with one another or via third party brokers to meet the demands of their subscribers. This peering will involve SIP user agents on both sides of a service provider-to-service provider interface, both of which will have a need to authenticate the other for security reasons.

In past SIP systems, the user agent that was requesting the services of another user agent could not initiate authentication of the other user agent. The user agent requesting the services is referred to in the art as a user agent client (UAC), and the user agent receiving the request is called the user agent server (UAS).

Past SIP authentication mechanisms, borrowed from HTTP, work well in smaller voice over internet protocol (VoIP) scenarios where the server is implicitly trusted and where the client is the untrusted entity, but can be inadequate in cases where the relationship between the UAS and UAC is a peer-to-peer relationship between coequals, such as the relationship between two telephony service providers. In these cases where the UAS and UAC are peers, past SIP systems may leave UACs less secure.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which.

DESCRIPTION OF EXAMPLE EMBODIMENTS

Overview

A system for client initiated authentication comprises a user agent client (UAC) and a user agent server (UAS). The user agent client is operable to communicate a session initiation protocol request. The session initiation protocol request comprises an authenticate header and a require header that comprises a server authentication tag. The user agent server is operable to receive the session initiation protocol request. The user agent server is further operable to communicate a session initiation protocol response in response to the session initiation protocol request. The session initiation protocol response comprises an authorization header having a credential of the user agent server.

Various embodiments of the invention may have none, some, or all of the following technical advantages. One embodiment of the present invention allows a UAC to initiate the authentication of a UAS. Furthermore, the UAC may require the authentication of the UAS before proceeding in a SIP session. By allowing the UAC to initiate authentication of the user agent server, security is enhanced in peer-to-peer SIP communications between coequals. Additionally, some embodiments reduce the number of message exchanges required for a UAS to be authenticated.

Other technical advantages of the present invention will be readily apparent to one skilled in the art from the description and the appended claims.

Description

Figure 1:
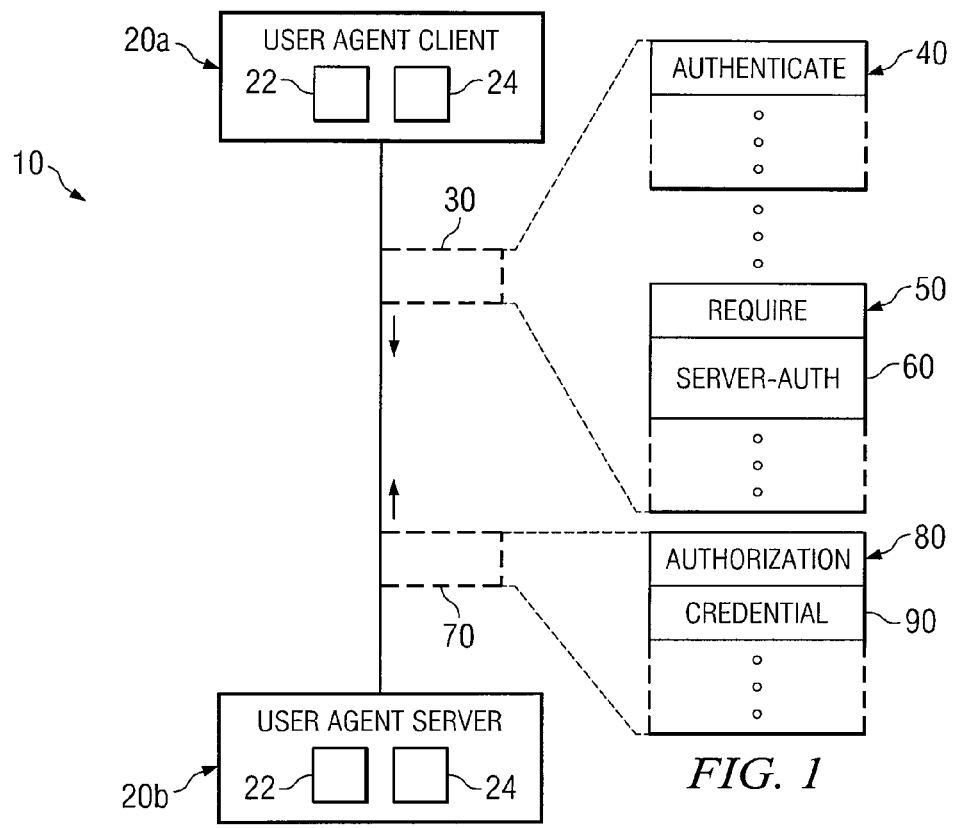
FIG. 1 is a simplified block diagram of a session initiation protocol (SIP) system, in accordance with one embodiment of the present invention.

FIG. 1 is a simplified block diagram of a session initiation protocol (SIP) system 10 that includes a user agent client (UAC) 20a and a user agent server (UAS) 20b. SIP is a peer-to-peer network communications protocol for multimedia conferencing over internet protocol (IP). SIP elements that are peers in a session communicating with one another are called user agents. A user agent 20 may function in one of the following roles: (1) as a UAC 20a that initiates a SIP request 30, or (2) as a UAS 20b that receives a SIP request 30 and that communicates a response 70. In general, UAC 20a may initiate authentication of UAS 20b based on the techniques described in detail below.

Communications between user agents are susceptible to interception and mimicking, causing a need for security and authentication to prevent unauthorized use. Borrowing heavily from the hypertext transfer protocol (HTTP), past SIP systems provide some basic authentication functionality. These systems allowed UASs 20b to initiate authentication of the UAC 20a. In certain cases, mutual authentication of both a UAC 20a and a UAS 20b could be performed. Even with mutual authentication, the UAC 20a could not initiate the authentication process. The inability of a UAC 20a to initiate authentication is problematic, especially when the client and the server are coequals, as can be found in a growing number of SIP systems where service providers peer with one another. Some embodiments address and resolve this problem. In accordance with the present invention, a UAC 20a may initiate the authentication process.

One way for the UAC 20a to initiate authentication of the UAS 20b is to add in its request 30 to the UAS 20b an authenticate header 40 and a require header 50 containing a server authentication tag 60. Authenticate headers 40, in past SIP systems, were included only in responses 70 from a UAS 20b, and not in requests 30 by a UAC 20a. System 10 allows them to be included in requests 30 sent by UAC 20a. Require headers 50 are used by a UAC 20a to communicate the SIP extensions that the UAC 20a expects a UAS 20b to support. The inclusion of a server authentication tag 60 in system 10 allows a UAC 20a to request the UAS 20b to provide credentials 90. A UAS 20b that receives a request 30 containing the authenticate header 40 and a server authentication tag 60 may provide in its response 70 its credentials 90 as part of an authorization header 80.

System 10 may have significant improvements over past SIP authentication schemes. By allowing the UAC 20a to initiate authentication of the UAS 20b, security may be enhanced in peer-to-peer SIP communications between coequals. Additionally, system 10 may reduce the number of message exchanges required for a UAS 20b to be authenticated. Different embodiments of the present invention may have none, some, or all of these advantages.

A user agent 20 comprises a processor 22 and a memory 24. A user agent 20 may be any combination of hardware, software and/or encoded logic that provides communication services. For example, a user agent 20 may include a telephone, a computer running telephony software, a video monitor, a camera or any other communication hardware, software and/or encoded logic that supports the communication of packets of media or frames using SIP system 10. A user agent 20 also may be a call agent, an unattended or automated system, a telephony gateway or other intermediate component or other device that can establish a media session. UACs 20a are user agents that are capable of generating and sending various SIP requests 30. UASs 20b are user agents that are capable of receiving and responding to SIP requests 30. At different times, a single device in SIP system 10 may function as both a UAS 20b and a UAC 20a, depending on its role.

A SIP request 30 could be one of several types of SIP messages, such as: Invite, Register, Subscribe, Options, Refer, and Notify. This list is in no way exhaustive, and various embodiments contemplate the use of other types of SIP requests, including future ones. Any of these SIP messages may be generated by a UAC 20a and communicated to a UAS 20b. Each SIP request 30 may include a plurality of headers. A header conveys information about the user agent 20 and about how to process the request 30. SIP requests 30 may include an additional two types of headers, an authenticate header 40 and a require header 50.

The authenticate header 40, which in some embodiments may be a WWW-Authenticate header or a Proxy-Authenticate header, is used to challenge a UAS 20b to present its credentials 90 for authorization. An authenticate header 40 may contain a plurality of parameters that are used to generate appropriate credentials 90. For example, the authenticate header 40 may specify both a nonce and a certain algorithm, such as message-digest algorithm 5 (MD5), to be used by a UAS 20b to generate its credentials 90. A header field specific to client initiated authentication may be used as the authenticate header 40. The ways in which the credentials 90 are generated are well known to those persons having ordinary skill in the art.

The require header 50, which in some embodiments may be a Require header or a Proxy-Require header, may contain one or more option tags that communicate the SIP extension a UAS 20b is expected to support in processing the request 30. Although the require header 50 is optional for SIP requests in general, when it is included, it cannot be ignored by a UAS 20b and is processed. A SIP extension is a set of defined functionality that is not necessarily supported by every user agent 20 in a given SIP system. Client initiated authentication may be one example of a SIP extension. In some embodiments, a server authentication tag 60 is used as an option tag in the require header 40 to indicate that the UAC 20a expects the UAS 20b to support client initiated authentication.

SIP responses 70 may be one of several types of responses supported by SIP. Generally, responses 70 are communicated by a UAS 20b to a UAC 20a in response to a request 30. Like SIP requests 30, each SIP response 70 may include a plurality of header fields. One header field that may be utilized in some embodiments is an authorization header 80. The authorization header 80, which may be an Authorization header or a Proxy-Authorization header in some embodiments, may be used to provide the credentials 90 of a user agent 20 for authentication. An authorization header 80 may include a plurality of parameters containing the credentials 90 and other information about the authentication request that will be used by the UAC 20a to authenticate the UAS 20b. The particular ways in which the credentials 90 are generated are well known to those persons having ordinary skill in the art.

Each SIP response 70 may be one of several types of SIP messages depending on the type of SIP message of the SIP request 30. For example, a UAS 20b receiving a Register type SIP request 30 from a UAC 20a, may generate a response 70 that is a SIP acknowledgement message. Also, the response 70 may vary depending upon whether the UAS 20b requires the UAC 20a to authenticate itself before the UAS 20b provides credentials 90. In these cases, the response 70 may not contain an authorization header 80. Instead, an authorization header 80 may be a part of a later response 70.

In operation, a UAC 20a generates a SIP request 30 containing, in some embodiments, a server authentication tag 60 and an authenticate header 40, and communicates the request 30 to a UAS 20b. The UAS 20b receives the SIP request 30. If the UAS 20b supports server authentication, it may generate one of three types of responses. First, the UAS 20b may create an authorization header 80, which includes its credentials 90, and communicate this information in the response 70. Second, the UAS 20b may respond by requiring that the UAC 20a provide credentials 90 first. Subsequently, UAS 20b may indeed communicate its credentials 90. This may be done with a SIP "401 Unauthorized" response (SIP 401 message) or a SIP "407 Proxy Authentication Required" response (SIP 407 message). Finally, the UAS 20b may refuse to provide its credentials 90 and communicate a final SIP 4xx request failure response. A UAS 20b that does not support server authentication may return a final SIP 4xx request failure response terminating the request, such as a SIP "420 Bad Extension" response. Other types of SIP responses are contemplated by various embodiments.

A UAC 20a may receive the response 70 from the UAS 20b. If the response 70 calls for the credentials 90 of the UAC 20a, then the UAC 20a may add its credentials 90 to and re-send the request 30. If the response 70 contains the credentials 90 of the UAS 20b, then the UAC 20a may validate the credentials 90 and continue the SIP session. If the credentials 90 are not valid, the UAC 20a may end the SIP session.

Figure 2:
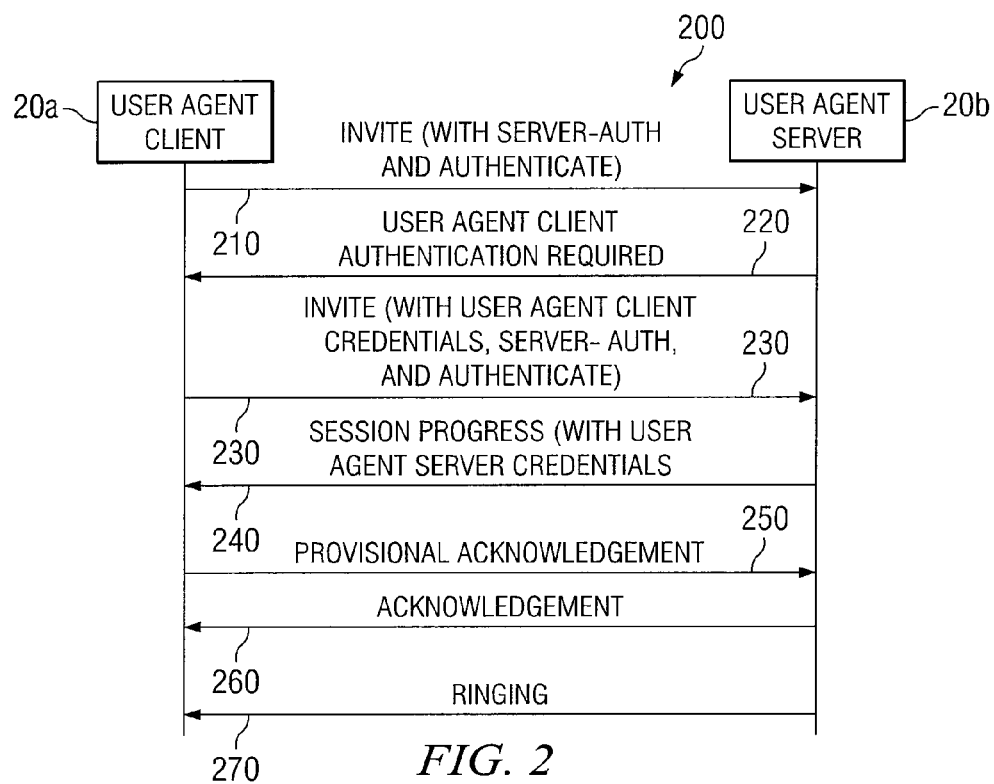
FIG. 2 is a call flow diagram illustrating one embodiment for a user agent client to request the credentials of a user agent server with a SIP invite request.

FIG. 2 is a call flow diagram demonstrating the steps performed when a UAC 20a uses client initiated authentication with an invite message to a UAS 20b. The method 200 begins with step 210, where the UAC 20a sends an invite request to UAS 20b. The invite request may contain a server authentication tag 60 and an authenticate header 40. The UAS 20b receives the invite request.

The method proceeds to step 220 where the UAS 20b generates a response, which, in this example call flow, requires authentication of the UAC 20a. This response may be implemented as a SIP 401 message or a SIP 407 message. UAS 20b communicates the response to the UAC 20a at step 220. The method then proceeds to step 230.

At step 230, UAC 20a processes the response, and communicates another invite request. This invite request contains in its authorization header the credentials of the UAC 20a required for authentication by the UAS 20b. The UAS 20b receives the invite request with the credentials. If the credentials are validated by UAS 20b, the method proceeds to step 240. In some embodiments, the UAS 20b may not require the credentials of the UAC 20a, thus steps 220 and 230 may be skipped.

At step 240, the UAS 20b generates a response 70 that may contain an authorization header 80 that includes the credentials of the UAS 20b. This response 70 may be implemented as a SIP "183 session progress" message, as in the present example method 200. The UAC 20a receives the response 70 containing the credentials of the UAS 20b.

At step 250, the UAC 20a evaluates the authorization header 80 of the session progress message sent by the UAS 20b. If the credentials in the authorization header 80 are valid, UAC 20a may generate and communicate to the UAS 20b a provisional acknowledgment. If the credentials were not valid, the UAC 20a may have responded by ending the SIP session.

After receiving a provisional acknowledgment, the UAS 20b may then generate an acknowledgment at step 260. The acknowledgment indicates that the invitation of the UAC 20a has been accepted and that the SIP session may proceed. At this point, step 270 is performed, and the UAS 20b communicates a ringing message to the UAC 20a. The remainder of the interactions between the UAC 20a and the UAS 20b are not shown, but may proceed as they would in past SIP systems.

Various embodiments of system 10 may perform steps not shown in FIG. 2. Likewise, other embodiments of system 10 may omit steps or perform steps in an order different from those shown in FIG. 2 while still being contemplated by the present invention. The method 200 is merely one embodiment of the claimed invention.

Figure 3:
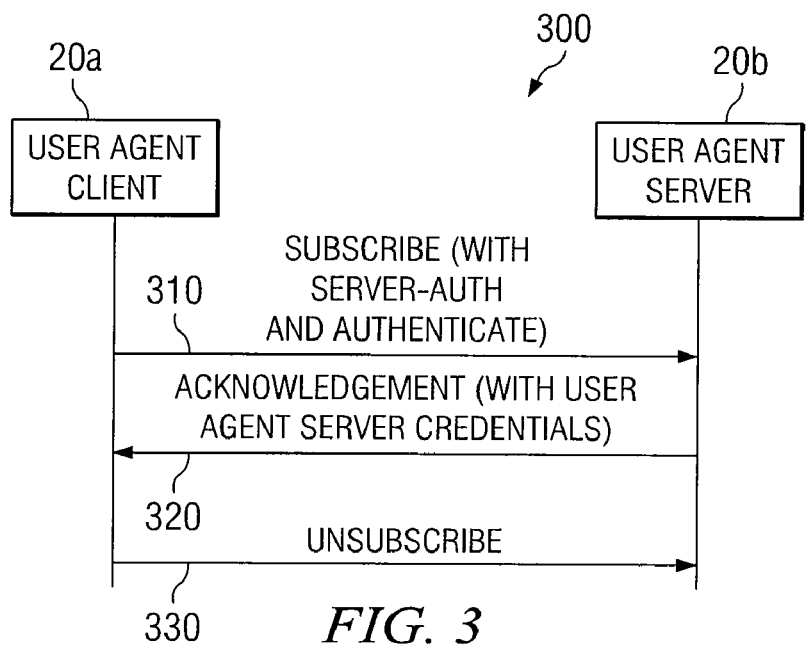
FIG. 3 is a call flow diagram illustrating one embodiment for a user agent client to request the credentials of a user agent server with a SIP subscribe request.

FIG. 3 is a call flow diagram demonstrating the steps performed when a UAC 20a subscribes to a UAS 20b using client initiated authentication. The method begins with step 310 where the UAC 20a communicates to the UAS 20b a subscribe request that contains a server authentication tag 60 and an authenticate header 40.

The method proceeds to step 320 where the UAS 20b processes the subscribe request. At this step, the UAS 20b may create and communicate an acknowledgment response that contains the credentials of the UAS 20b. In some embodiments, instead of responding with its own credentials in step 320, the UAS 20b may first require the UAC 20a to send its credentials in a manner similar to that demonstrated in steps 220 and 230 of FIG. 2. The method then proceeds to step 330.

At step 330, the UAC 20a validates the credentials. If the credentials provided by the UAS 20b are valid, the subscribe request sent by the UAC 20a may be considered successful and the method 300 may end without executing step 330. However, if the credentials provided by the UAS 20b are invalid, the method may proceed to step 330 where the UAC 20a may unsubscribe to the UAS 20b. The UAC 20a may unsubscribe by communicating a SIP Subscribe message with an expiration interval equal to zero.

Various embodiments of system 10 may perform steps not shown in FIG. 3. Likewise, other embodiments of system 10 may omit steps or perform steps in an order different from those shown in FIG. 3 while still being contemplated by the present invention. The method 300 is merely one embodiment of the claimed invention.

Figure 4:
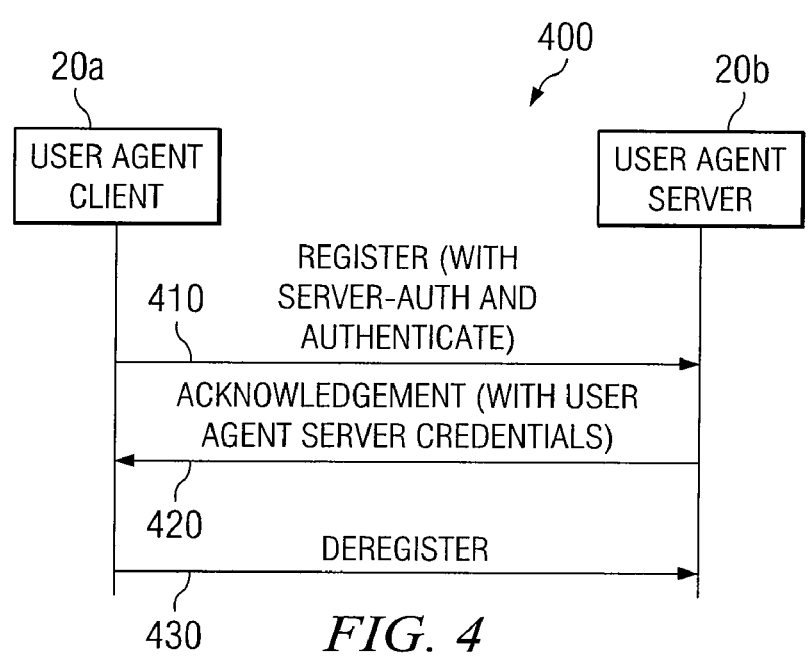
FIG. 4 is a call flow diagram illustrating one embodiment for a user agent client to request the credentials of a user agent server with a SIP register request.

FIG. 4 is a call flow diagram demonstrating the steps performed when a UAC 20a registers with a UAS 20b using client initiated authentication. The method begins with step 410 where the UAC 20a communicates to the UAS 20b a subscribe request that contains a server authentication tag 60 and an authenticate header 40.

The method proceeds to step 420 where the UAS 20b processes the register request. At this step, the UAS 20b may create and communicate an acknowledgment response that contains the credentials of the UAS 20b. In some embodiments, instead of responding with its own credentials in step 420, the UAS 20b may first require the UAC 20a to authenticate itself in a manner similar to that demonstrated in steps 220 and 230 of FIG. 2. The method then proceeds to step 430.

At step 430, the UAC 20a validates the credentials. If the credentials provided by the UAS 20b are valid, the register request sent by the UAC 20a may be considered successful and the method 400 may end without executing step 430. However, if the credentials provided by the UAS 20b are invalid, the method may proceed to step 430 where the UAC 20a may deregister with the UAS 20b. The UAC 20a may deregister by communicating a SIP Register message with an expiration interval equal to zero.

Various embodiments of system 10 may perform steps not shown in FIG. 4. Likewise, other embodiments of system 10 may omit steps or perform steps in an order different from those shown in FIG. 4 while still being contemplated by the present invention. The method 400 is merely one embodiment of the claimed invention.

Numerous other changes, substitutions, variations, alterations, and modifications may be ascertained by those skilled in the art and it is intended that the present invention encompass all such changes, substitutions, variations, alterations, and modifications as falling within the spirit and scope of the appended claims. Moreover, the present invention is not intended to be limited in any way by any statement in the specification that is not otherwise reflected in the appended claims.

What is claimed is:

1. A system for client initiated authentication comprising:
   a user agent client comprising a processor, the user agent client operable to:
      communicate a Session Initiation Protocol (SIP) request, the Session Initiation Protocol (SIP) request comprising:
         a require header comprising a server authentication tag; and
         an authenticate header to challenge a user agent server to generate one or more credentials; and
   a user agent server comprising a processor, the user agent server operable to:
      receive the Session Initiation Protocol (SIP) request; and
      communicate a Session Initiation Protocol (SIP) response in response to the Session Initiation Protocol (SIP) request, wherein the Session Initiation Protocol (SIP) response comprises an authorization header having the one or more credentials of the user agent server.

2. The system of claim 1, wherein the user agent client is further operable to receive the Session Initiation Protocol (SIP) response and to validate the credential.

3. The system of claim 2, wherein the user agent client is further operable to end a Session Initiation Protocol (SIP) session if the Session Initiation Protocol (SIP) response fails to contain a required credential.

4. The system of claim 3, wherein the Session Initiation Protocol (SIP) request is one of the set comprising a Session Initiation Protocol (SIP) register request, a Session Initiation Protocol (SIP) subscribe request, and a session initiation invite request.

5. The system of claim 1, wherein the authenticate header is one of the set comprising: a Session Initiation Protocol (SIP) WWW-Authenticate header and a Session Initiation Protocol (SIP) Proxy-Authenticate header.

6. The system of claim 1, wherein the authorization header is one of the set comprising: a Session Initiation Protocol (SIP) Authorization header and a Session Initiation Protocol (SIP) Proxy-Authorization header.

7. The system of claim 1, wherein the Session Initiation Protocol (SIP) response is one of the set comprising:
- a Session Initiation Protocol (SIP) session progress response;
- a Session Initiation Protocol (SIP) acknowledgement response;
- a Session Initiation Protocol (SIP) unauthorized response;
- a Session Initiation Protocol (SIP) proxy authentication required response;
- a Session Initiation Protocol (SIP) final request failure response; and
- a Session Initiation Protocol (SIP) bad extension response.

8. A system for client initiated authentication comprising:
- client means for communicating a Session Initiation Protocol request, the Session Initiation Protocol (SIP) request comprising:
  - a require header comprising a server authentication tag; and
  - an authenticate header to challenge a user agent server to generate one or more credentials; and
- server means for receiving the Session Initiation Protocol (SIP) request; and
- means for communicating a Session Initiation Protocol (SIP) response that is operable to communicate a Session Initiation Protocol (SIP) response in response to the Session Initiation Protocol (SIP) request, the Session Initiation Protocol (SIP) response comprising an authorization header having the one or more credentials of the server means for communicating a Session Initiation Protocol (SIP) response.

9. The system of claim 8, further comprising means for validating the credential.

10. The system of claim 9, further comprising means for ending a Session Initiation Protocol (SIP) session if the Session Initiation Protocol (SIP) response fails to contain a required credential.

11. A method for client initiated authentication, comprising:
- receiving a Session Initiation Protocol (SIP) request at a user agent server, where the Session Initiation Protocol (SIP) request comprises:
  - a require header comprising a server authentication tag; and
  - an authenticate header to challenge a user agent server to generate one or more credentials; and
- communicating a Session Initiation Protocol (SIP) response to a user agent client in response to the Session Initiation Protocol (SIP) request, wherein the Session Initiation Protocol (SIP) response comprises an authorization header having the one or more credentials of the user agent server.

12. The method of claim 11, wherein the Session Initiation Protocol (SIP) request is one of the set comprising: Invite, Subscribe, and Register Session Initiation Protocol (SIP) requests.

13. The method of claim 11, wherein the authenticate header is one of the set comprising: a Session Initiation Protocol (SIP) WWW-Authenticate header and a Session Initiation Protocol (SIP) Proxy-Authenticate header.

14. The method of claim 11, wherein the authorization header is one of the set comprising: a Session Initiation Protocol (SIP) Authorization header and a Session Initiation Protocol (SIP) Proxy-Authorization header.

15. The method of claim 11, wherein the Session Initiation Protocol (SIP) response is one of the set comprising:
- a Session Initiation Protocol (SIP) session progress response;
- a Session Initiation Protocol (SIP) acknowledgement response;
- a Session Initiation Protocol (SIP) unauthorized response;
- a Session Initiation Protocol (SIP) proxy authentication required response;
- a Session Initiation Protocol (SIP) final request failure response; and
- a Session Initiation Protocol (SIP) bad extension response.

16. A method for client initiated authentication, comprising:
- communicating a Session Initiation Protocol (SIP) request to a user agent server, where the Session Initiation Protocol (SIP) request comprises:
  - a require header comprising a server authentication tag; and
  - an authenticate header to challenge a user agent server to generate one or more credentials, and
- receiving a Session Initiation Protocol (SIP) response at the user agent client based on the Session Initiation Protocol (SIP) request, where the Session Initiation Protocol (SIP) response comprises an authorization header, where the authorization header comprises the one or more credentials of the user agent server.

17. The method of claim 16, wherein the Session Initiation Protocol (SIP) request is one of the set comprising: invite, subscribe, and register Session Initiation Protocol (SIP) requests.

18. The method of claim 16, wherein the authenticate header is one of the set comprising: Session Initiation Protocol (SIP) WWW-Authenticate header and Session Initiation Protocol (SIP) Proxy-Authenticate header.

19. The method of claim 16, wherein the authorization header is one of the set comprising: a Session Initiation Protocol (SIP) Authorization header and a Session Initiation Protocol (SIP) Proxy-Authorization header.

20. The method of claim 16, wherein the Session Initiation Protocol (SIP) response is one of the set comprising:
- a Session Initiation Protocol (SIP) session progress response;
- a Session Initiation Protocol (SIP) acknowledgement response;
- a Session Initiation Protocol (SIP) unauthorized response;
- a Session Initiation Protocol (SIP) proxy authentication required response;
- a Session Initiation Protocol (SIP) final request failure response; and
- a Session Initiation Protocol (SIP) bad extension response.

21. The method of claim 16, further comprising:
- validating the credential; and
- ending a Session Initiation Protocol (SIP) session if the credential is invalid.

22. The method of claim 21, wherein the step of ending the Session Initiation Protocol (SIP) session comprises deregistering.

23. The method of claim 21, wherein the step of ending the Session Initiation Protocol (SIP) session comprises unsubscribing.

* * * * *